United States Patent
Moro

(10) Patent No.: US 10,540,847 B2
(45) Date of Patent: Jan. 21, 2020

(54) GAMING SYSTEM AND METHOD FOR PROVIDING A VARIABLE AWARD IN ASSOCIATION WITH A VIRTUAL CURRENCY PURCHASE

(71) Applicant: Double Down Interactive LLC, Seattle, WA (US)

(72) Inventor: Andrea Moro, Seattle, WA (US)

(73) Assignee: Double Down Interactive LLC, Seattle, WA (US)

( * ) Notice: Subject to any disclaimer, the term of this patent is extended or adjusted under 35 U.S.C. 154(b) by 0 days.

(21) Appl. No.: 16/128,067

(22) Filed: Sep. 11, 2018

(65) Prior Publication Data

US 2019/0012878 A1 Jan. 10, 2019

Related U.S. Application Data

(63) Continuation of application No. 15/231,402, filed on Aug. 8, 2016, now Pat. No. 10,163,302.

(51) Int. Cl.
*G07F 17/32* (2006.01)
*G06Q 30/06* (2012.01)

(52) U.S. Cl.
CPC ..... *G07F 17/3244* (2013.01); *G06Q 30/0601* (2013.01); *G07F 17/3211* (2013.01); *G07F 17/3225* (2013.01); *G07F 17/3267* (2013.01)

(58) Field of Classification Search
CPC .................................. G07F 17/00; A63F 13/00
USPC .......................................................... 463/25
See application file for complete search history.

(56) References Cited

U.S. PATENT DOCUMENTS

| | | |
|---|---|---|
| 4,531,187 A | 7/1985 | Uhland et al. |
| 5,761,647 A | 6/1998 | Boushy |
| 5,813,912 A | 9/1998 | Shultz et al. |
| 5,836,817 A | 11/1998 | Acres et al. |
| 5,910,048 A | 6/1999 | Feinberg |
| 5,919,090 A | 7/1999 | Mothwurf |
| 5,932,869 A | 8/1999 | Gottlich et al. |
| 6,110,042 A | 8/2000 | Walker et al. |
| 6,142,876 A | 11/2000 | Cumbers et al. |
| 6,179,711 B1 | 1/2001 | Yoseloff |
| 6,213,877 B1 | 4/2001 | Walker et al. |
| 6,267,671 B1 | 7/2001 | Hogan |
| 6,302,793 B1 | 10/2001 | Fertitta, III et al. |
| 6,328,649 B1 | 12/2001 | Randall et al. |
| 6,398,643 B1 | 6/2002 | Knowles et al. |
| 6,569,015 B1 | 5/2003 | Baerlocher et al. |
| 6,578,199 B1 | 6/2003 | Tsou et al. |

(Continued)

OTHER PUBLICATIONS

International Search Report and the Written Opinion for International Application No. PCT/US2017/045279 dated Nov. 2, 2017.

(Continued)

*Primary Examiner* — Pierre E Elisca
(74) *Attorney, Agent, or Firm* — Neal, Gerber & Eisenberg LLP

(57) ABSTRACT

A gaming system which enables a player to purchase an amount of virtual currency from an online casino wherein the purchased virtual currency includes a predetermined component and a variable component. In association with a purchase of an amount of virtual currency, the gaming system utilizes one or more random determinations to potentially modify the purchased amount of virtual currency.

16 Claims, 7 Drawing Sheets

(56) References Cited

U.S. PATENT DOCUMENTS

| | | |
|---|---|---|
| 6,620,046 B2 | 9/2003 | Rowe |
| 6,652,380 B1 | 11/2003 | Luciano |
| 6,672,589 B1 | 1/2004 | Lemke et al. |
| 6,712,697 B2 | 3/2004 | Acres |
| 6,722,985 B2 | 4/2004 | Criss-Puszkiewicz et al. |
| 6,722,986 B1 | 4/2004 | Lyons et al. |
| 6,755,741 B1 | 6/2004 | Rafaeli |
| 6,776,715 B2 | 8/2004 | Price |
| 6,848,995 B1 | 2/2005 | Walker et al. |
| 6,890,256 B2 | 5/2005 | Walker et al. |
| 6,908,387 B2 | 6/2005 | Hedrick et al. |
| 6,997,807 B2 | 2/2006 | Weiss |
| 7,025,674 B2 | 4/2006 | Adams et al. |
| 7,083,518 B2 | 8/2006 | Rowe |
| 7,083,520 B2 | 8/2006 | Rowe |
| 7,094,149 B2 | 8/2006 | Walker et al. |
| 7,112,138 B2 | 9/2006 | Hedrick et al. |
| 7,198,571 B2 | 4/2007 | LeMay et al. |
| 7,291,068 B2 | 11/2007 | Bryant et al. |
| 7,303,470 B2 | 12/2007 | George et al. |
| 7,303,475 B2 | 12/2007 | Britt et al. |
| 7,306,518 B2 | 12/2007 | Hughs-Baird et al. |
| 7,311,605 B2 | 12/2007 | Moser |
| 7,318,774 B2 | 1/2008 | Bryant et al. |
| 7,338,370 B2 | 3/2008 | Oles et al. |
| 7,526,447 B2 | 4/2009 | Rowe |
| 7,611,411 B2 | 11/2009 | Griswold et al. |
| 7,617,151 B2 | 11/2009 | Rowe |
| 7,674,180 B2 | 3/2010 | Graham et al. |
| 7,684,874 B2 | 3/2010 | Schlottmann et al. |
| 7,684,882 B2 | 3/2010 | Baerlocher et al. |
| 7,689,302 B2 | 3/2010 | Schlottmann et al. |
| 7,690,996 B2 | 4/2010 | Iddings et al. |
| 7,695,366 B1 | 4/2010 | Holch |
| 7,710,538 B2 | 6/2010 | Nguyen et al. |
| 7,749,081 B1 | 7/2010 | Acres |
| 7,753,789 B2 | 7/2010 | Walker et al. |
| 7,758,417 B2 | 7/2010 | Jorasch et al. |
| 7,758,429 B2 | 7/2010 | Crivelli et al. |
| 7,775,876 B2 | 8/2010 | Rowe |
| 7,780,525 B2 | 8/2010 | Walker et al. |
| 7,787,972 B2 | 8/2010 | Schlottmann et al. |
| 7,862,430 B2 | 1/2011 | Baerlocher et al. |
| 7,867,081 B2 | 1/2011 | Schneider et al. |
| 7,878,901 B2 | 2/2011 | Walker et al. |
| 7,890,419 B2 | 2/2011 | Jung et al. |
| 7,892,092 B2 | 2/2011 | Matthews et al. |
| 7,927,212 B2 | 4/2011 | Hedrick et al. |
| 7,985,133 B2 | 7/2011 | Baerlocher et al. |
| 7,988,551 B2 | 8/2011 | Walker et al. |
| 7,993,199 B2 | 8/2011 | Iddings et al. |
| 8,012,009 B2 | 9/2011 | Iddings et al. |
| 8,057,298 B2 | 11/2011 | Nguyen et al. |
| 8,096,873 B2 | 1/2012 | Walker et al. |
| 8,135,644 B2 | 3/2012 | Rowe |
| 8,192,276 B2 | 6/2012 | Walker et al. |
| 8,202,156 B2 | 6/2012 | Bartholomew |
| 8,449,378 B2 | 5/2013 | Michaelson et al. |
| 8,457,991 B2 | 6/2013 | Jung et al. |
| 8,465,363 B1 | 6/2013 | Mayeroff |
| 8,657,668 B1 * | 2/2014 | Coronel ............ G07F 17/3267 463/22 |
| 8,784,178 B2 | 7/2014 | Adams et al. |
| 9,098,387 B1 | 8/2015 | Curtis et al. |
| 9,280,875 B2 | 3/2016 | Pincus et al. |
| 9,299,215 B2 | 3/2016 | Gagner et al. |
| 9,452,356 B1 | 9/2016 | Tsao et al. |
| 2001/0037243 A1 | 11/2001 | Rouston et al. |
| 2002/0013728 A1 | 1/2002 | Wilkman |
| 2002/0123376 A1 | 9/2002 | Walker et al. |
| 2002/0155887 A1 | 10/2002 | Criss-Puszkiewicz et al. |
| 2003/0013513 A1 | 1/2003 | Rowe |
| 2003/0032474 A1 | 2/2003 | Kaminkow |
| 2003/0083943 A1 | 5/2003 | Adams et al. |
| 2003/0127511 A1 | 7/2003 | Kelly et al. |
| 2003/0161509 A1 | 8/2003 | Kendall |
| 2003/0212597 A1 | 11/2003 | Ollins |
| 2003/0224852 A1 | 12/2003 | Walker et al. |
| 2003/0232647 A1 | 12/2003 | Moser |
| 2004/0064371 A1 | 4/2004 | Crapo |
| 2004/0097287 A1 | 5/2004 | Postrel |
| 2004/0113360 A1 | 6/2004 | George et al. |
| 2004/0117112 A1 | 6/2004 | Ogino et al. |
| 2004/0142742 A1 | 7/2004 | Schneider et al. |
| 2004/0143494 A1 | 7/2004 | Henderson et al. |
| 2004/0166931 A1 | 8/2004 | Criss-Puszkiewicz et al. |
| 2004/0204235 A1 | 10/2004 | Walker et al. |
| 2004/0214622 A1 | 10/2004 | Atkinson |
| 2005/0003890 A1 | 1/2005 | Hedrick et al. |
| 2005/0009601 A1 | 1/2005 | Manfredi et al. |
| 2005/0143166 A1 | 6/2005 | Walker et al. |
| 2005/0153768 A1 | 7/2005 | Paulsen |
| 2005/0153773 A1 | 7/2005 | Nguyen et al. |
| 2005/0210102 A1 | 9/2005 | Johnson et al. |
| 2005/0239546 A1 | 10/2005 | Hedrick et al. |
| 2005/0261059 A1 | 11/2005 | Nguyen et al. |
| 2005/0261060 A1 | 11/2005 | Nguyen et al. |
| 2005/0261061 A1 | 11/2005 | Nguyen et al. |
| 2006/0003831 A1 * | 1/2006 | Falciglia, Sr. .......... G07F 17/32 463/20 |
| 2006/0053055 A1 | 3/2006 | Baggett et al. |
| 2006/0143085 A1 | 6/2006 | Adams et al. |
| 2006/0148561 A1 | 7/2006 | Moser |
| 2006/0184419 A1 | 8/2006 | Postrel |
| 2006/0211493 A1 | 9/2006 | Walker et al. |
| 2006/0242021 A1 | 10/2006 | Pavelle et al. |
| 2006/0277100 A1 | 12/2006 | Parham |
| 2007/0027769 A1 | 2/2007 | Bender |
| 2007/0093299 A1 | 4/2007 | Bergeron et al. |
| 2007/0202941 A1 | 8/2007 | Miltenberger et al. |
| 2008/0051195 A1 | 2/2008 | Hedrick et al. |
| 2008/0070680 A1 | 3/2008 | Baerlocher et al. |
| 2008/0076496 A1 | 3/2008 | Baerlocher et al. |
| 2008/0076534 A1 | 3/2008 | Iddings et al. |
| 2008/0076542 A1 | 3/2008 | Iddings et al. |
| 2008/0076571 A1 | 3/2008 | Frerking |
| 2008/0076576 A1 | 3/2008 | Graham et al. |
| 2009/0042644 A1 | 2/2009 | Zielinski |
| 2009/0082109 A1 | 3/2009 | Sepich et al. |
| 2009/0124384 A1 | 5/2009 | Smith et al. |
| 2009/0270180 A1 | 10/2009 | Stewart |
| 2010/0120499 A1 | 5/2010 | Cohen |
| 2010/0227664 A1 | 9/2010 | Walker et al. |
| 2010/0227675 A1 | 9/2010 | Luxton et al. |
| 2010/0227684 A1 | 9/2010 | Walker et al. |
| 2010/0227693 A1 | 9/2010 | Umaki et al. |
| 2010/0228606 A1 | 9/2010 | Walker et al. |
| 2010/0240443 A1 | 9/2010 | Baerlocher et al. |
| 2010/0267444 A1 | 10/2010 | Walker et al. |
| 2011/0130188 A1 | 6/2011 | Walker et al. |
| 2011/0190066 A1 | 8/2011 | Barclay et al. |
| 2011/0212764 A1 | 9/2011 | Baerlocher et al. |
| 2011/0269545 A1 | 11/2011 | Kelly et al. |
| 2012/0088573 A1 | 4/2012 | Hedrick et al. |
| 2012/0178514 A1 | 7/2012 | Schulzke et al. |
| 2012/0238354 A1 | 9/2012 | Walker et al. |
| 2013/0036064 A1 | 2/2013 | Osvald et al. |
| 2013/0065669 A1 | 3/2013 | Michaelson et al. |
| 2013/0079120 A1 | 3/2013 | Walker et al. |
| 2013/0084961 A1 | 4/2013 | Radisich et al. |
| 2013/0084962 A1 | 4/2013 | Radisich et al. |
| 2013/0084994 A1 | 4/2013 | Farrar |
| 2013/0172073 A1 | 7/2013 | Herrmann et al. |
| 2013/0184059 A1 | 7/2013 | Costello |
| 2013/0203483 A1 | 8/2013 | Joshi et al. |
| 2013/0210511 A1 | 8/2013 | LaRocca et al. |
| 2013/0217479 A1 | 8/2013 | Luxton |
| 2013/0246125 A1 | 9/2013 | DiGioacchino et al. |
| 2013/0252638 A1 | 9/2013 | Yang et al. |
| 2014/0229264 A1 | 8/2014 | Ross |
| 2014/0289033 A1 | 9/2014 | Ortigoza |
| 2015/0269806 A1 | 9/2015 | Richards |

(56) References Cited

U.S. PATENT DOCUMENTS

2016/0012680 A1    1/2016   Katz et al.
2016/0055481 A1    2/2016   Ellis et al.

OTHER PUBLICATIONS

International Preliminary Report on Patentability for International Application No. PCT/US2017/045279 dated Feb. 21, 2019.

* cited by examiner

GAMING SYSTEM AND METHOD FOR PROVIDING A VARIABLE AWARD IN ASSOCIATION WITH A VIRTUAL CURRENCY PURCHASE

PRIORITY CLAIM

This application is a continuation of, claims priority to and the benefit of U.S. patent application Ser. No. 15/231,402, filed on Aug. 8, 2016, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In such known gaming machines, the amount of the wager made on the base game by the player may vary. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

Certain gaming systems can be implemented in a networked environment, such as over the Internet, to enable a plurality of players to each participate simultaneously in plays of the game using their own personal electronic device. For example, certain gaming systems enable a plurality of players to access those gaming systems via one or more web browsers running on one or more client computers, such as one or more desktop computers, laptop computers, tablet computers, personal digital assistants, mobile phones, netbooks, or other appropriate computing devices. Thus, players from different geographic locations each participate in a same game by accessing an appropriate server and providing wagers on plays of the game.

Certain casual or social games playable via social networks or online casinos in a networked environment employ virtual currency in the form of virtual points or credits which may not be redeemed for any monetary value (contrasted with land-based casinos which employ credits redeemable for monetary currency). Certain known casual or social games provide players virtual currency awards (contrasted with land-based casinos which employ monetary awards or awards of credit redeemable for monetary currency). Such causal or social games generally require the player to place or make a virtual currency wager to activate the casual or social game. The amount of the virtual currency wager made by the player may vary. In many of these casual or social games, the virtual currency award is based on the player obtaining a winning symbol or symbol combination and on the amount of the virtual currency wager (e.g., the higher the virtual currency wager, the higher the virtual currency award). The virtual currency award may not be redeemed for any monetary value and is available to be placed on a subsequent play of another casual or social game.

In addition to obtaining virtual currency via one or more casual or social games played, certain social networks or online casinos periodically provide an amount of virtual currency to players of the casual or social games. For example, an online casino gives players an amount of virtual currency daily or multiple times throughout a day. The amount of virtual currency given away at each interval may be predetermined (e.g., two-hundred virtual chips every two hours) or randomly determined (e.g., players spin a daily wheel to determine a daily give away of ten-thousand virtual chips to one-million virtual chips). Upon receipt of an amount of virtual currency, the players are free to use the virtual currency (which may not be redeemed for any monetary value) to play the above-described casual or social games (with a goal of winning even more virtual currency).

Moreover, certain social networks or online casinos enable players to purchase virtual currency using monetary currency. For example, to purchase an amount of virtual currency, the online casino causes a display of different pricing options or packages (e.g., from $1 to $100), where each package enables the player to purchase a set amount of virtual currency (e.g., one-million virtual chips for $1). Following the purchase of an amount of virtual currency, the players are free to use the virtual currency (which may not be redeemed for any monetary value) to play the above-described casual or social games (with a goal of winning even more virtual currency).

While such avenues to obtain additional virtual currency are available to players, social networks and online casinos are in need of alternative avenues to provide virtual currency to players. Accordingly, a continuing need exists to provide new and different ways to provide virtual currency to players.

SUMMARY

In various embodiments, the gaming system disclosed herein enables a player to purchase an amount of virtual currency from an online casino wherein the purchased virtual currency includes a predetermined component and a variable component. In these embodiments, in association with a purchase of an amount of virtual currency, the gaming system utilizes one or more random determinations to potentially modify the purchased amount of virtual currency. The gaming system then makes such a modified amount of currency available to the player to use to play one or more casual or social games (with a goal of winning even more virtual currency). Accordingly, the gaming system disclosed herein bundles one or more randomly determined modifiers (e.g., an additional amount of virtual currency or a multiplier of the purchased amount of virtual currency) with a purchased amount of virtual currency to determine a total amount of virtual currency associated with the player's decision to purchase any virtual currency. Such a configuration of offering a variable, unknown amount of virtual credits in addition to a predetermined, known amount of credits creates a new and different avenue to provide virtual currency to players. Such a configuration thus advances virtual currency technology by introducing an element of chance or randomness in the quantity of virtual currency provided to a player compared to the quantity of virtual currency purchased by a player.

In certain embodiments, upon a suitable triggering event, such as a player requesting to purchase an amount of virtual currency or a player's balance of virtual currency falling below a threshold amount, the gaming system enables the player to purchase an amount of virtual currency. In one such embodiment, the gaming system enables the player to purchase different predetermined amounts of virtual currency for different predetermined amounts of consideration (e.g., monetary currency, player tracking points or promotional credits) according to a predetermined purchase schedule. In another such embodiment, the gaming system enables the player to purchase different amounts of virtual currency for different amounts of consideration based on a variable purchase schedule. For example, based on the player's virtual currency purchasing history and/or the player's redemption of virtual currency on plays of one or more games, the gaming system determines different amounts of virtual currency available to be purchased for different amounts of consideration.

Following the player purchasing an amount of virtual currency, the gaming system determines a variable amount of virtual currency to provide to the player as part of the purchase. That is, in addition to or as an alternative of the amount of virtual currency purchased by the player, the gaming system also randomly determines an additional or alternative amount of virtual currency to credit the player's account in association with the player's purchase of virtual currently. As such, the gaming system couples an established amount of virtual currency with a variable amount of virtual currency to provide to the player in association with the player's purchase of the established amount of virtual currency.

In certain embodiments, this variable amount of virtual currency is determined at least partially based on the amount of virtual currency the player purchased. For example, the gaming system enables the player to participate in a supplemental or side game wherein the gaming system randomly determines a modifier, such as a multiplier, from a plurality of different modifiers. In this example, the gaming system determined modifier is applied to the purchased amount of virtual currency to determine a total amount of virtual currency to provide to the player in association with the player's purchase.

In certain embodiments, this variable amount of virtual currency is determined independent of the amount of virtual currency the player purchased. For example, the gaming system enables the player to participate in a supplemental or side game wherein the gaming system randomly determines an additional amount of virtual currency. In this example, the gaming system determined additional amount of virtual currency is added to the purchased amount of virtual currency to determine a total amount of virtual currency to provide to the player in association with the player's purchase.

Following the determination of a total amount of virtual currency to provide to the player in association with the player's purchase, the gaming system enables the player to utilize such virtual currency to play one or more casual or social games (with a goal of winning even more virtual currency). Accordingly, the gaming system disclosed herein advances virtual currency technology by increasing the amount of volatility associated with the purchase of predetermined amounts of virtual currency.

Additional features and advantages are described in, and will be apparent from, the following Detailed Description and the figures.

DETAILED DESCRIPTION

Variable Amounts of Virtual Currency

In various embodiments, the gaming system disclosed herein enables a player to purchase an amount of virtual currency from an online casino wherein the purchased virtual currency includes a predetermined component and a variable component. In these embodiments, in association with a purchase of an amount of virtual currency, the gaming system utilizes one or more random determinations to potentially modify the purchased amount of virtual currency. The gaming system then makes such a modified amount of currency available to the player to use to play one or more casual or social games (with a goal of winning even more virtual currency). Accordingly, the gaming system disclosed herein bundles one or more randomly determined modifiers (e.g., an additional amount of virtual currency or a multiplier of the purchased amount of virtual currency) with a purchased amount of virtual currency to determine a total amount of virtual currency associated with the player's decision to purchase any virtual currency. Such a configuration of offering a variable, unknown amount of virtual credits in addition to a predetermined, known amount of credits creates a new and different avenue to provide virtual currency to players. Such a configuration thus advances virtual currency technology by introducing an element of chance or randomness in the quantity of virtual currency provided to a player compared to the quantity of virtual currency purchased by a player.

It should be appreciated that while the player's credit balance, the player's wager, and any awards are described as an amount of virtual credits or currency in certain of the below embodiments, one or more of such player's credit balance, such player's wager, and any awards provided to such player may be for monetary credits, promotional credits, and/or player tracking points or credits. It should be further appreciated that while certain of the embodiments described herein are directed to playing one or more casual or social games (i.e., games associated with non-monetary awards), the present disclosure may additionally or alternatively be employed in association with one or more non-casual or non-social games (i.e., games associated with monetary awards) such as primary games and/or one or more secondary games.

Figure 1:
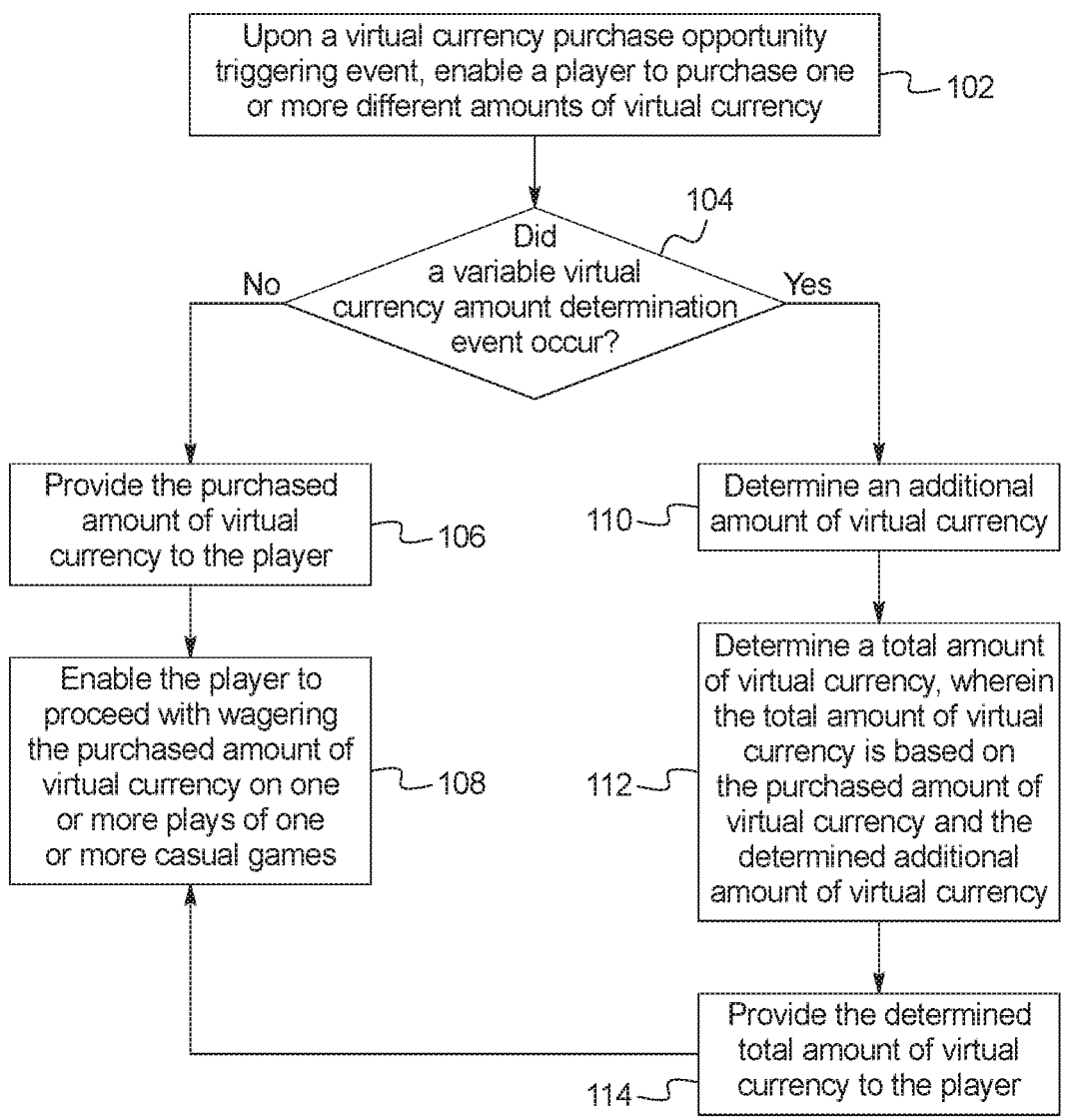
FIG. 1 is a flow-chart of one embodiment of the gaming system disclosed herein illustrating a variable amount of virtual currency being provided with a purchased amount of virtual currency.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In one embodiment, as indicated in block 102, upon a virtual currency purchase opportunity triggering event, the gaming system enables a player to purchase one or more different amounts or quantities of virtual currency.

In one embodiment, a virtual currency purchase opportunity triggering event occurs upon one or more player inputs to purchase an amount of virtual currency. In another embodiment, a virtual currency purchase opportunity triggering event occurs upon the gaming system determining that a virtual credit balance has fallen below a threshold amount, such as a minimum wager amount necessary to play one or more games.

Figure 2A:
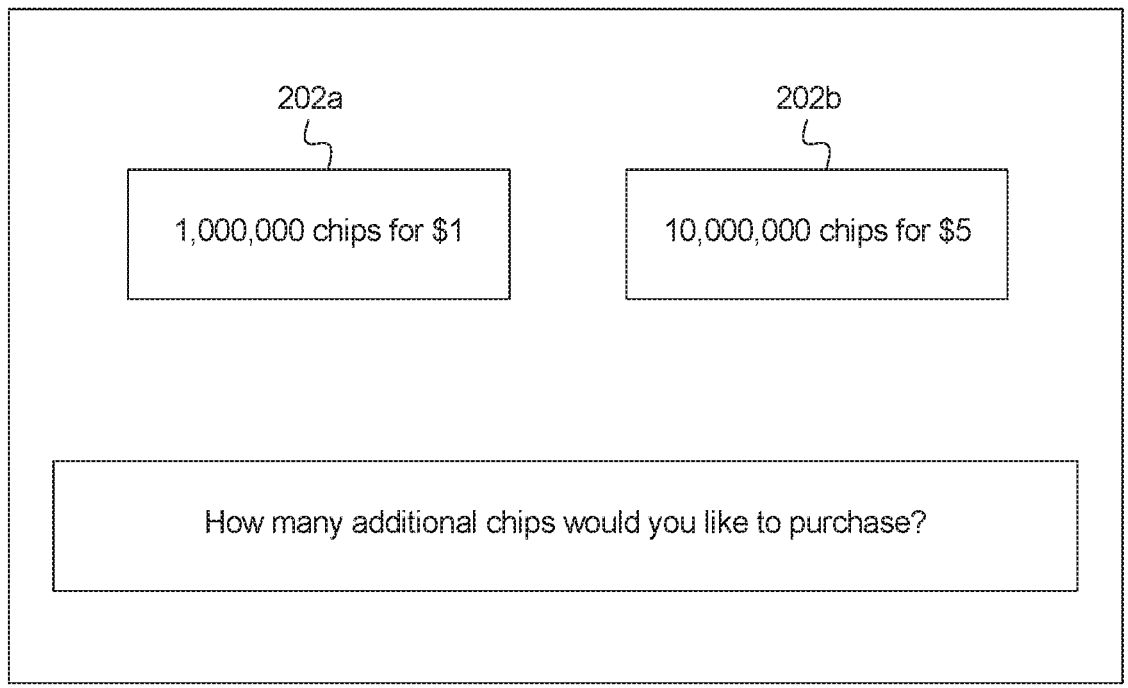
FIGS. 2A, 2B, and 2C are example screen shots of the gaming system disclosed herein illustrating a variable amount of virtual currency being provided with a purchased amount of virtual currency.

In one embodiment, upon an occurrence of a virtual currency purchase opportunity triggering event, the gaming system displays an amount of virtual currency available to be purchased for an amount of consideration. In another embodiment, upon an occurrence of a virtual currency purchase opportunity triggering event, the gaming system displays a plurality of different amounts of virtual currency available to be purchased for a plurality of different amounts of consideration. For example, as seen in FIG. 2A, the gaming system displays a first virtual currency purchase option of 1,000,000 virtual chips for $1 202*a*. In this example, the gaming system also displays a second virtual currency purchase option of 10,000,000 virtual chips for $5 202*b*. It should be appreciated that any suitable quantity of virtual currency may be purchased for any suitable amount of consideration utilizing any suitable virtual currency purchase option.

In one embodiment, one or more virtual currency purchase options are predetermined. In another embodiment, one or more virtual currency purchase options are variable. In this embodiment, based on one or more factors associated with the player, the gaming system varies the amounts of virtual currency available to be purchased by the player. In one example, the gaming system determines an amount of virtual currency available to be purchased based on a player's virtual currency purchase history. In another example, the gaming system determines an amount of virtual currency available to be purchased based on a player's virtual currency wagering history or pattern of wagering.

In one embodiment, the gaming system enables a player to purchase an amount of virtual currency using monetary consideration, such as cash, a credit card, a quantity of monetary credits, a balance of money transferred from one or more accounts, and/or a traveler's check. In another embodiment, the gaming system enables a player to purchase an amount of virtual currency using non-monetary consideration, such as a quantity of non-monetary credits, a quantity of promotional credits, and/or a quantity of player tracking points. It should be appreciated that any suitable form of consideration may be utilized in association with the purchase of an amount of virtual currency.

Following a player input to purchase an amount of virtual currency, the gaming system determines if a variable virtual currency amount determination event occurs as indicated in diamond 104 of FIG. 1.

In one embodiment, a variable virtual currency amount determination event occurs in association with each purchase of an amount of virtual currency. In another embodiment, a variable virtual currency amount determination event occurs in association with some, but not all, purchases of an amount of virtual currency. In one such embodiment, a variable virtual currency amount determination event occurs based on an amount of the purchased virtual currency. For example, the greater the amount of virtual currency purchased, the greater the probability that a variable virtual currency amount determination event will occur. In another such embodiment, a variable virtual currency amount determination event occurs based on one or more attributes or characteristics of the player. For example, the higher the player tracking ranking of the player, the higher the probability that a variable virtual currency amount determination event will occur. In another such embodiment, a variable virtual currency amount determination event occurs based on one or more attributes or characteristics of the casual or social games played. For example, the greater the amount of virtual currency wagered on one or more games played, the greater the probability that a variable virtual currency amount determination event will occur.

If the gaming system determines that no variable virtual currency amount determination event occurs, as indicated in block 106, the gaming system provides the purchased amount of virtual currency to the player. The gaming system then enables the player to proceed with wagering the purchased amount of virtual currency on one or more plays of one or more social or casual games as indicated in block 108.

On the other hand, if the gaming system determines that a variable virtual currency amount determination event occurs, as indicated in block 110, the gaming system determines an additional amount of virtual currency to provide to the player. In one such embodiment, this determined additional amount of virtual currency is based on an amount of the purchased virtual currency. In another such embodiment, this determined additional amount of virtual currency is based on one or more attributes or characteristics of the player or the player's wagering history. In another such embodiment, this determined additional amount of virtual currency is based on one or more attributes or characteristics of the casual or social games played.

In one embodiment, if the gaming system determines that a variable virtual currency amount determination event occurs, the gaming system determines an additional amount of virtual currency to provide to the player independent of any displayed event associated with any plays of any of games. In another embodiment, if the gaming system determines that a variable virtual currency amount determination event occurs, the gaming system determines an additional amount of virtual currency to provide to the player in association with a play of a casual or social game.

In another embodiment, if the gaming system determines that a variable virtual currency amount determination event occurs, the gaming system determines an additional amount of virtual currency to provide to the player in association with one or more plays of one or more supplemental or side games. In this embodiment, the gaming system displays such plays of such supplemental games and determines, based on the outcomes of such plays of such supplemental games, an additional amount of virtual currency to provide to the player.

In one embodiment, the gaming system automatically displays the play of such supplemental games following the purchase of an amount of virtual currency. In another embodiment, the gaming system displays the play of such supplemental games upon one or more player inputs following the purchase of an amount of virtual currency. In one such embodiment, with the purchase of an amount of virtual currency, the gaming system associates one or more supplemental game tickets with the player. Each supplemental game ticket of this embodiment is redeemable for one play of a supplemental game to determine an amount of additional virtual currency to provide to the player. In different embodiments, the quantity of supplemental game tickets associated with a player is based on an amount of the purchased virtual currency (e.g., the greater the amount of virtual currency purchased, the greater the quantity of supplemental game tickets associated with the player), based on one or more attributes or characteristics of the player (e.g., the higher the player tracking ranking of the player, the higher the quantity of supplemental game tickets associated with the player), and/or based on one or more attributes or characteristics of the casual or social games played (e.g., the greater the amount of virtual currency wagered on one or more games played, the greater the quantity of supplemental game tickets associated with the player).

Figure 2B:
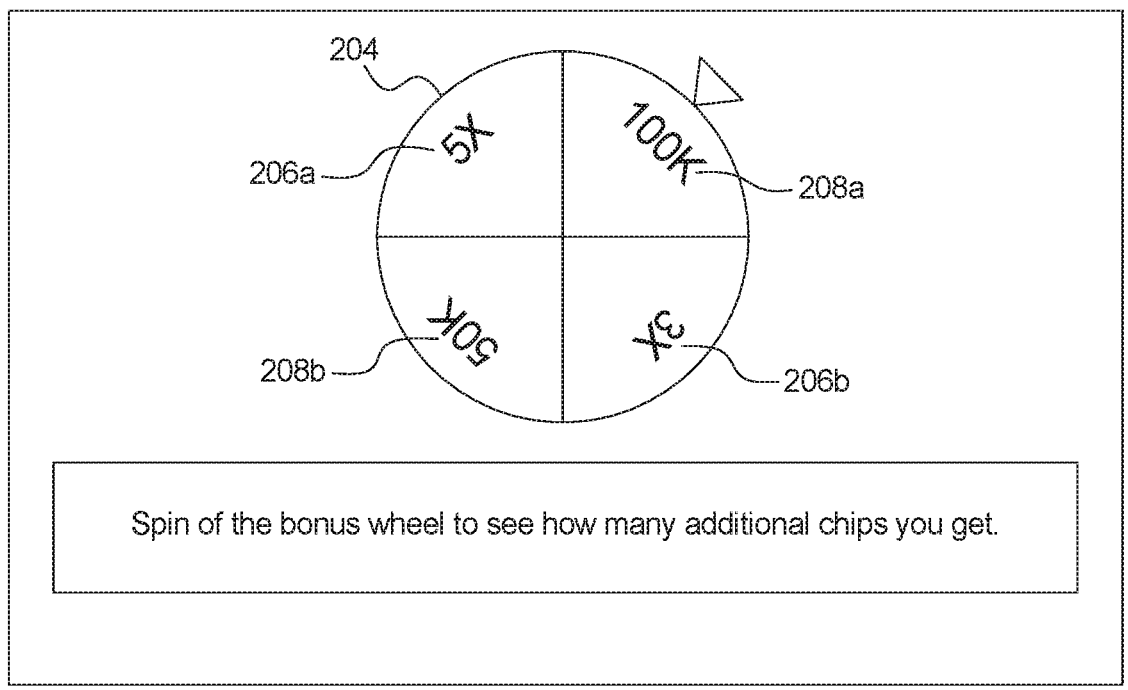

For example, as seen in FIG. 2B, following the player's decision to purchase 10,000,000 virtual chips for $5, the gaming system displays a play of a wheel-based supplemental game of chance. As seen in FIG. 2B, the wheel-based supplemental game of chance utilizes an additional virtual currency generator 204 associated with a plurality of different additional amounts of virtual currency. In this example, the additional virtual currency generator is associated with a plurality of amounts of additional virtual currency, such as 100,000 additional virtual chips 208a and 50,000 additional virtual chips 208b and a plurality of modifiers of the purchased amount of virtual currency, such as a multiplier of 5× 206a and a multiplier of 3× 206b. It should be appreciated that in different embodiments, the additional virtual currency generator may include different amounts of additional virtual currency, different modifiers of the purchased amount of virtual currency, no amounts of additional virtual currency (i.e., the additional virtual currency generator only includes modifiers of the purchased amount of virtual currency), or no modifiers of the purchased amount of virtual currency (i.e., the additional virtual currency generator only includes amounts of additional virtual currency).

Figure 2C:
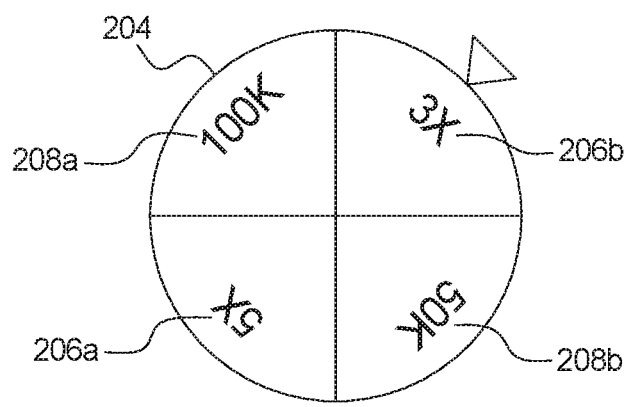

In operation of this example, for each play of the wheel-based supplemental game of chance, the gaming system activates the virtual currency generator to randomly select an amount of additional virtual currency or a modifier of the purchased amount of virtual currency. As seen in FIG. 2C, the player's purchase of 10,000,000 virtual chips for $5 earned the player one activation or spin of the virtual currency generator which resulted in the random selection of an additional 20,000,000 virtual chips. Specifically, the spin of the virtual currency generator of FIG. 2C resulted in a multiplier of 3× which when applied to the 10,000,000 purchased virtual chips results in a total of 30,000,000 virtual chips.

It should be appreciated that in one embodiment wherein a modifier is selected to modify the purchased amount of virtual currency, the player is provided both the purchased amount of virtual currency and the modified amount of purchased virtual currency. For example, with reference to FIG. 2C, the spin of the virtual currency generator resulted in a multiplier of 3× which when applied to the 10,000,000 purchased virtual chips results in a total of 40,000,000 virtual chips (or (10,000,000 virtual chips×1× (for the purchase))+(10,000,000×3× (for the spin of the virtual currency generator)) provided to the player. In another embodiment wherein a modifier is selected to modify the purchased amount of virtual currency, the player is provided the modified amount of purchased virtual currency. For example, with reference to FIG. 2C, the spin of the virtual currency generator resulted in a multiplier of 3× which when applied to the 10,000,000 purchased virtual chips results in a total of 30,000,000 virtual chips (or (10,000,000 virtual chips×1× (for the purchase))+(10,000,000×2× (for the spin of the virtual currency generator)) provided to the player.

It should be further appreciated that any suitable game may be implemented in accordance with the supplemental game disclosed herein (and/or the social or casual game disclosed herein). In different embodiments, such played games include, but are not limited to:

i. a play of any suitable slot game;
ii. a play of any suitable wheel game;
iii. a play of any suitable card game;
iv. a play of any suitable offer and acceptance game;
v. a play of any suitable award ladder game;
vi. a play of any suitable puzzle-type game;
vii. a play of any suitable persistence game;
viii. a play of any suitable selection game;
ix. a play of any suitable cascading symbols game;
x. a play of any suitable ways to win game;
xi. a play of any suitable scatter pay game;
xii. a play of any suitable coin-pusher game;
xiii. a play of any suitable elimination game;
xiv. a play of any suitable stacked wilds game;
xv. a play of any suitable trail game;
xvi. a play of any suitable bingo game;
xvii. a play of any suitable video scratch-off game;
xviii. a play of any suitable pick-until-complete game;
xix. a play of any suitable shooting simulation game;
xx. a play of any suitable racing game;
xxi. a play of any suitable promotional game;
xxii. a play of any suitable high-low game;
xxiii. a play of any suitable lottery game;
xxiv. a play of any suitable number selection game;
xxv. a play of any suitable dice game;
xxvi. a play of any suitable skill game;
xxvii. a play of any suitable auction game;
xxviii. a play of any suitable reverse-auction game;
xxix. a play of any suitable group game;
xxx. a play of any suitable game in a service window;
xxxi. a play of any suitable game on a mobile device; and/or
xxxii. a play of any suitable game disclosed herein.

Following the gaming system determining an additional amount of virtual currency, as indicated in block 112 of FIG. 1, the gaming system determines a total amount of virtual currency to provide to the player, wherein the total amount of virtual currency is based on the purchased amount of virtual currency and the determined additional amount of virtual currency.

In one embodiment, the total amount of virtual currency to provide to player in association with the player's decision to purchase an amount of virtual currency is different from the purchased amount of virtual currency. In this embodiment, if the gaming system determines that the additional amount of virtual currency is greater than zero or if the gaming system determines a modifier of at least 2× to apply to the purchased amount of virtual currency, the total amount of virtual currency is greater than the purchased amount of virtual currency. For example, if the player made one or more inputs to purchase 1,000,000 virtual chips and the gaming system determined a modifier of 5× to apply to the purchased amount of virtual currency, the gaming system determines a total amount of virtual currency of 5,000,000 virtual chips (or (1,000,000 virtual chips×1× (for the purchase))+(1,000,000×4× (in association with the variable virtual currency amount determination event)).

In another embodiment, the total amount of virtual currency to provide to player in association with the player's decision to purchase an amount of virtual currency is the purchased amount of virtual currency. In this embodiment, if the gaming system determines that the additional amount of virtual currency is zero or if the gaming system determines a modifier of 1× to apply to the purchased amount of virtual currency, the total amount of virtual currency equals the purchased amount of virtual currency. For example, if the player made one or more inputs to purchase 1,000,000 virtual chips and the gaming system determined a modifier of 1× to apply to the purchased amount of virtual currency, the gaming system determines a total amount of virtual currency of 1,000,000 virtual chips (or (1,000,000 virtual chips×1× (for the purchase))+(1,000,000×0× (in association with the variable virtual currency amount determination event)).

After determining a total amount of virtual currency based on the purchased amount of virtual currency and the determined additional amount of virtual currency, the gaming system provides the determined total amount of virtual currency to the player as indicated in block 114 of FIG. 1. The gaming system then enables the player to proceed with wagering the purchased amount of virtual currency on one or more plays of one or more social or casual games as indicated in block 108.

In one embodiment, following the determination of a variable amount of virtual currency to provide to the player in association with the purchase of an amount of virtual currency, the gaming system determines an additional variable amount of virtual currency to provide to the player. In one such embodiment, the gaming system enables the player to purchase this additional variable amount of virtual currency to provide to the player. In another such embodiment, the gaming system provides this additional variable amount of virtual currency to provide to the player without any additional consideration from the player.

In one embodiment, the type of virtual currency purchased is the same as the type of virtual currency determined in association with the occurrence of the variable virtual currency amount determination event. In another embodiment, the type of virtual currency purchased is different from the type of virtual currency determined in association with the occurrence of the variable virtual currency amount determination event.

In certain embodiments, such as certain of the above-described embodiments, the gaming system is implemented in a networked environment in association with one or more personal gaming devices, such as desktop computers, laptop computers, tablet computers or computing devices, personal digital assistants, mobile phones, and other mobile computing devices. In these embodiments, the gaming system enables a player to log on from an application or a personal web browser to a social network and/or an online casino which uses one or more servers, to enable such players to wager on the plays of games as described herein. In certain other embodiments, the gaming system disclosed herein may be implemented in a gaming establishment, such as at one or more electronic gaming machines located at a land-based casino. In certain other embodiments, the gaming system is implemented in a networked environment, and also implemented in a gaming establishment, such as at one or more electronic gaming machines located at a land-based casino. For example, the gaming system enables a player to play a supplemental game while playing an electronic gaming machine located at a land-based casino wherein the results of the supplemental game are utilized to modify an amount of virtual currency subsequently purchased from an online casino.

In certain embodiments, such as certain of the above-described embodiments, the gaming system makes one or more determinations utilizing information associated with an online gaming experience, such as a player's online wagering history. In certain other embodiments, the gaming system makes one or more determinations utilizing information associated with a gaming experience which occurs at or in association with a land-based gaming establishment, such as a player's wagering history at a land-based casino where a plurality of electronic gaming machines are located. In certain other embodiments, the gaming system makes one or more determinations utilizing information associated with an online gaming experience and also makes one or more determinations utilizing information associated with a gaming experience which occurs at or in association with a land-based gaming establishment. For example, the gaming system determines a range of additional amounts of virtual currency to utilize in a supplemental game based on the player's wagering history of virtual currency while determining a range of modifiers to utilize in a supplemental game based on the player's player tracking status at a land-based casino.

In certain embodiments wherein the gaming system is implemented in association with a social network and/or online casino, the gaming system enables the player to play one or more social or casual games and/or supplemental games to win one or more amounts of virtual currency, such as a quantity of non-monetary credits, a quantity of promotional credits or a quantity of player tracking points. In certain embodiments wherein the gaming system is implemented in association with or at a gaming establishment, such as a land-based casino, one or more awards provided in association with one or more social or casual game plays, one or more supplemental games, one or more primary games and/or one or more secondary game plays include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

It should be appreciated that in different embodiments, one or more of:
  i. whether a virtual currency purchase opportunity triggering event occurs;
  ii. an amount of virtual currency available for purchase;
  iii. an amount of consideration required to purchase an amount of virtual currency;
  iv. whether a variable virtual currency amount determination event occurs;

v. an additional amount of virtual currency to provide in association with an occurrence of a variable virtual currency amount determination event;
vi. a type of virtual currency available to be purchased;
vii. a type of virtual currency available to be provided in association with an occurrence of a variable virtual currency amount determination event;
viii. which supplemental game to trigger;
ix. one or more attributes or parameters utilized for a play of one or more games (including supplemental games);
x. one or more paytables utilized for a play of one or more games (including supplemental games);
xi. one or more average expected amounts of additional virtual currency associated with one or more plays of one or more supplemental games;
xii. one or more amounts of virtual currency available for a play of one or more supplemental games;
xiii. one or more ranges of amounts of virtual currency available for a play of one or more supplemental games;
xiv. a quantity of supplemental game tickets to associated with a player;
xv. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 3:
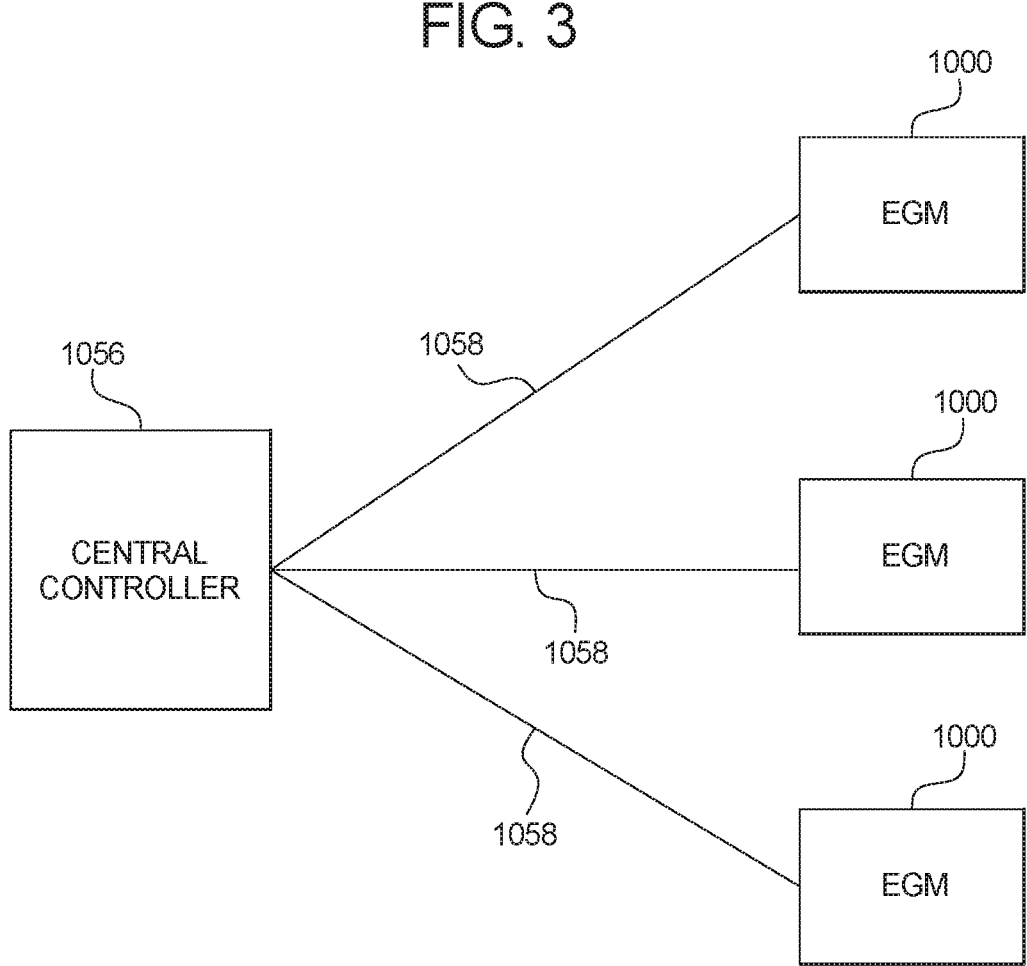
FIG. 3 is a schematic block diagram of one embodiment of a network configuration of an example gaming system disclosed herein.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 3 includes a plurality of EGMs 1000 that are each configured to communicate with a central server, central controller, or remote host 1056 through a data network 1058.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network; and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled "Internet Remote Game Server," and U.S. Pat. No. 8,147,334, entitled "Universal Game Server," which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
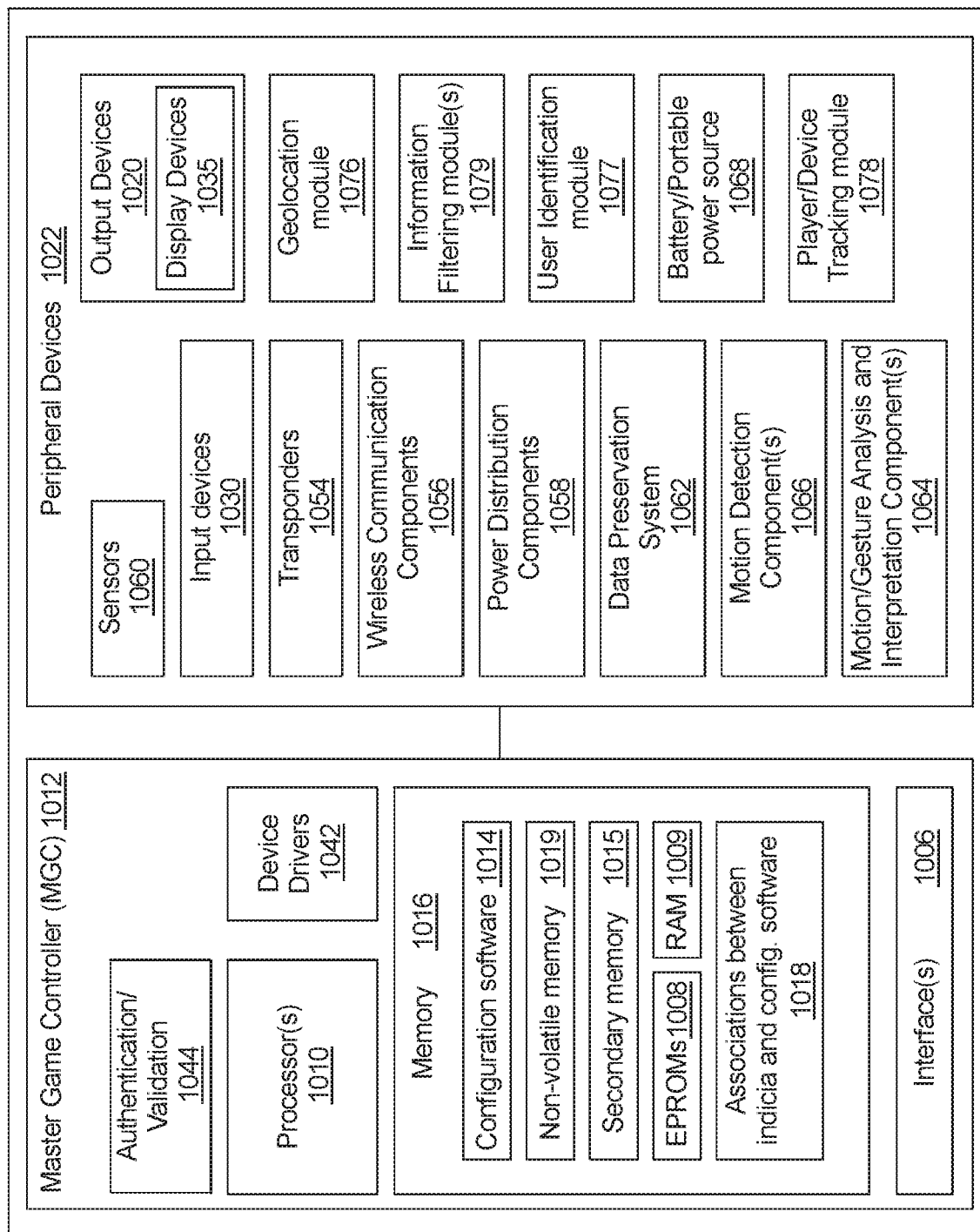
FIG. 4 is a schematic block diagram of one embodiment of an electronic configuration of an example gaming system disclosed herein.
Figure 5A:
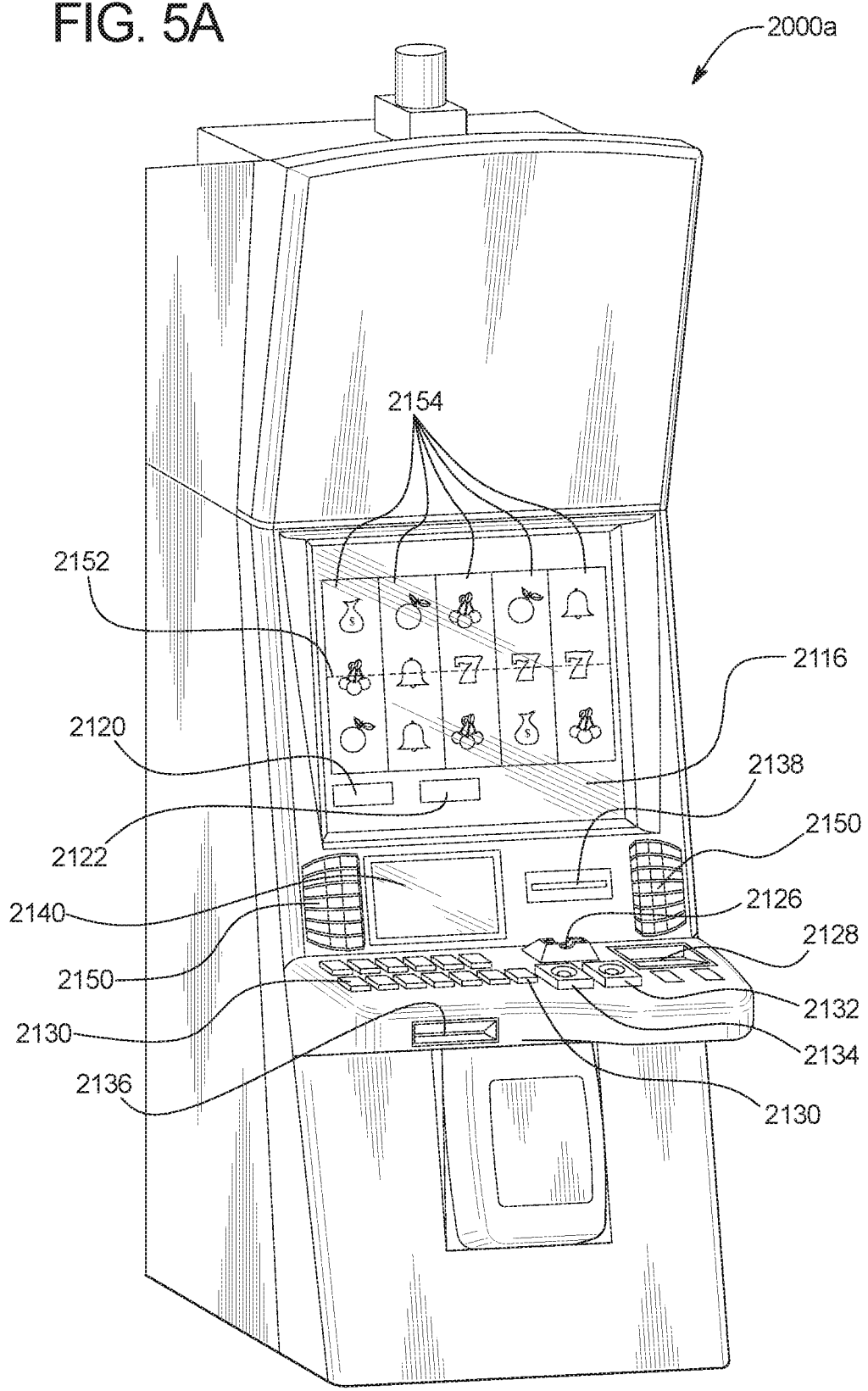
FIGS. 5A and 5B are perspective views of example alternative embodiments of a gaming system disclosed herein.
Figure 5B:
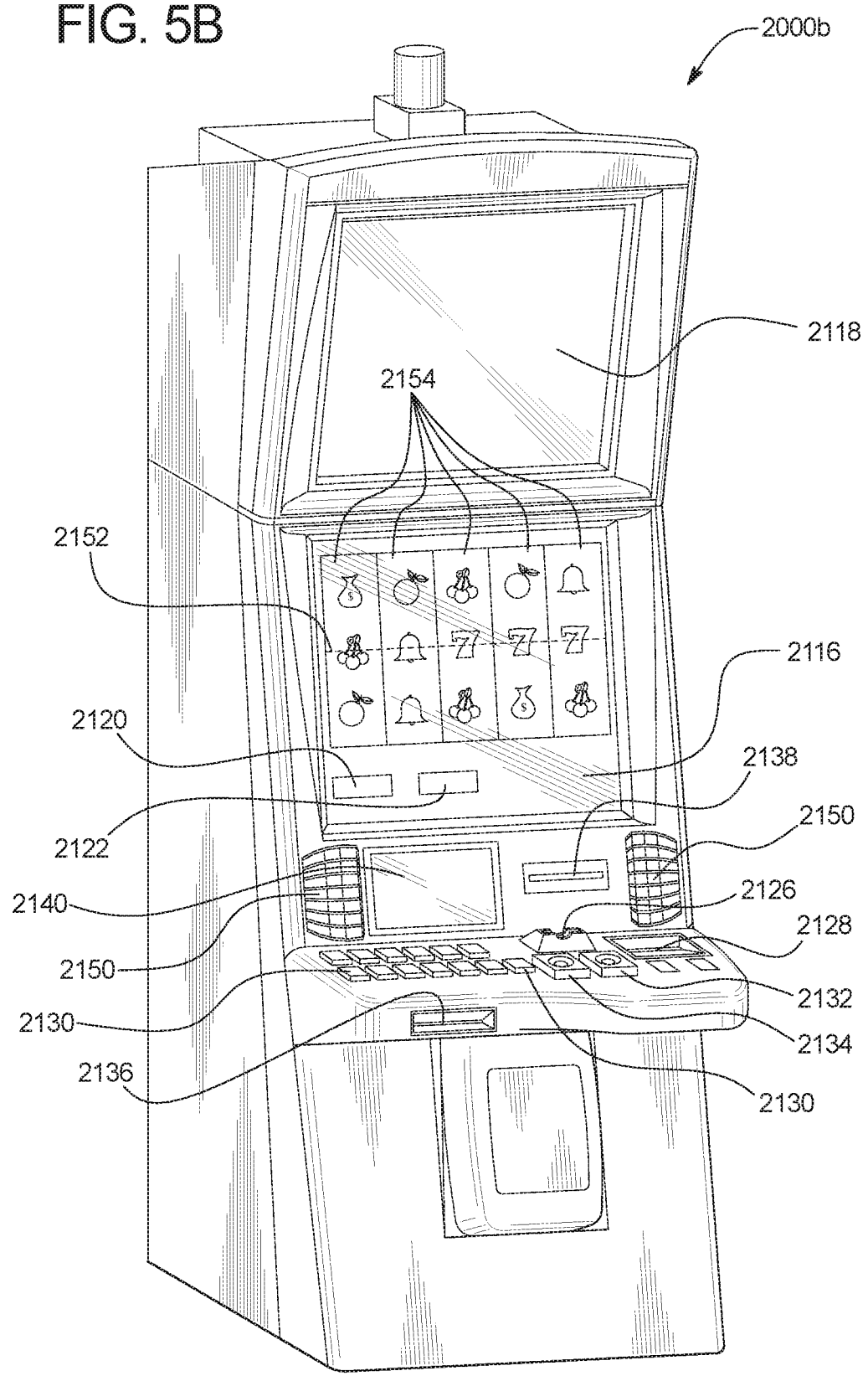

FIG. 4 is a block diagram of an example EGM 1000 and FIGS. 5A and 5B include two different example EGMs 2000a and 2000b. The EGMs 1000, 2000a, and 2000b are merely example EGMs, and different EGMs may be implemented using different combinations of the components shown in the EGMs 1000, 2000a, and 2000b.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 5A includes a central display device 2116, a player tracking display 2140, a credit display 2120, and a bet display 2122. The example EGM 2000b illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000a and 2000b illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons," which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000a and 2000b illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000a and 2000b illustrates in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine," which is incorporated herein by reference. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.)

and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000a and 2000b illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000a and 2000b shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process.

In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern," which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services," which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 5B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations," which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards," which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win," which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services," which are incorporated herein by reference.

Differentiating Certain Gaming Systems from General Purpose Computing Devices

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes," which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play," which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM.

The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system server comprising:
at least one processor; and
at least one memory device which stores a plurality of instructions, which when executed by the at least one processor cause the at least one processor to:
 (a) receive data associated with an amount of purchased virtual currency,
 (b) responsive to a variable virtual currency amount determination event occurring independent of any wager amount placed on any play of any game:
  (i) determine an additional amount of virtual currency, wherein said determined additional amount of virtual currency is based on at least one random determination,
  (ii) cause a display, by a display device, of the determined additional amount of virtual currency,
  (iii) determine a total amount of virtual currency, wherein said total amount of virtual currency is based on the amount of purchased virtual currency and the determined additional amount of virtual currency,
  (iv) cause a display, by the display device, of the determined total amount of virtual currency, and
  (v) receive data associated with a placement of a wager amount of said displayed total amount of virtual currency in association with at least one play of at least one game, and
 (c) responsive to no variable virtual currency amount determination event occurring, receive data associated with a wager amount of said amount of purchased virtual currency in association with the at least one play of the at least one game.

2. The gaming system server of claim 1, wherein when executed by the at least one processor, the plurality of instructions cause the at least one processor to determine the additional amount of virtual currency in association with at least one supplemental game.

3. The gaming system server of claim 1, wherein when executed by the at least one processor, the plurality of instructions cause the at least one processor to receive data corresponding to at least one player input associated with when to determine the additional amount of virtual currency responsive to the variable virtual currency amount determination event occurring.

4. The gaming system server of claim 3, wherein the at least one player input associated with when to determine the additional amount of virtual currency occurs in association with a redemption of a ticket.

5. The gaming system server of claim 1, wherein the additional amount of virtual currency is a multiple of the amount of purchased virtual currency.

6. The gaming system server of claim 1, wherein the purchased virtual currency is a first type of virtual currency and the additional virtual currency is a second, different type of virtual currency.

7. The gaming system server of claim 1, wherein the amount of purchased virtual currency is for an amount of monetary currency.

8. The gaming system server of claim 1, wherein non-monetary awards are available to be won in association with the at least one play of the at least one game.

9. A method of operating a gaming system, said method comprising:
   (a) receiving data associated with an amount of purchased virtual currency,
   (b) responsive to a variable virtual currency amount determination event occurring independent of any wager amount placed on any play of any game:
      (i) determining, by a processor, an additional amount of virtual currency, wherein said determined additional amount of virtual currency is based on at least one random determination,
      (ii) displaying, by at least one display device, the determined additional amount of virtual currency,
      (iii) determining, by the processor, a total amount of virtual currency, wherein said total amount of virtual currency is based on the amount of purchased virtual currency and the determined additional amount of virtual currency,
      (iv) displaying, by the at least one display device, the determined total amount of virtual currency, and
      (v) receiving data associated with a placement of a wager amount of said displayed total amount of virtual currency in association with at least one play of at least one game, and
   (c) responsive to no variable virtual currency amount determination event occurring, receiving data associated with a placement of a wager amount of said amount of purchased virtual currency in association with the at least one play of the at least one game.

10. The method of claim 9, further comprising determining, by the processor, the additional amount of virtual currency in association with at least one supplemental game.

11. The method of claim 9, further comprising receiving data corresponding to at least one player input associated with when to determine the additional amount of virtual currency responsive to the variable virtual currency amount determination event occurring.

12. The method of claim 11, wherein the at least one player input associated with when to determine the additional amount of virtual currency occurs in association with a redemption of a ticket.

13. The method of claim 9, wherein the additional amount of virtual currency is a multiple of the amount of purchased virtual currency.

14. The method of claim 9, wherein the purchased virtual currency is a first type of virtual currency and the additional virtual currency is a second, different type of virtual currency.

15. The method of claim 9, wherein the amount of purchased virtual currency is for an amount of monetary currency.

16. The method of claim 9, wherein non-monetary awards are available to be won in association with the at least one play of the at least one game.

\* \* \* \* \*